Figure 1:
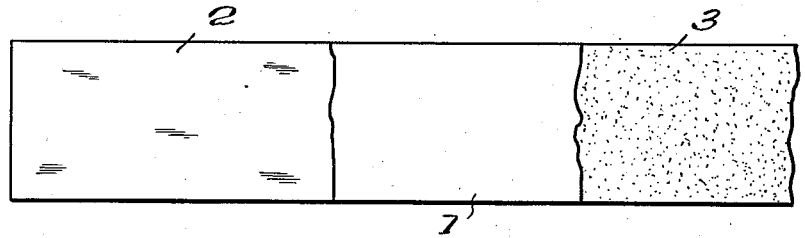

June 23, 1942.  J. W. RAYNOLDS  2,287,063
CONTAINER CLOSURE LINER
Filed Jan. 30, 1939

Inventor
James W. Raynolds
By K. P. McElroy
Attorney

Patented June 23, 1942

2,287,063

UNITED STATES PATENT OFFICE 2,287,063

CONTAINER CLOSURE LINER

James Wallace Raynolds, Pittsburgh, Pa., assignor to The Raolin Corporation, Charleston, W. Va., a corporation of West Virginia Application January 30, 1939, Serial No. 253,681

3 Claims. (Cl. 288—34)

This invention relates to container closures, and it comprises a closure top for containers for foods, beverages, drugs and cosmetics, the closure being provided on an inner surface with a layer of rubber chloride varnish grease-proofed by an addition of a vinyl acetate resin, said layer being advantageously applied to a separable liner of paper or the like, which may have gasketing functions; and it comprises liners for such closures; all as more fully hereinafter set forth and as claimed.

Foods, drugs, cosmetics and other commodities are often packaged in bottles, jars and like containers having removable tops or closures, which may be provided with lugs or threads engaging the bottle or jar neck. These closures are usually made of metal, or of a molded plastic material. In practically all cases, the color, taste and odor of the packaged material are important, and it is therefore necessary to protect the closure and the contents of the bottle against each other. Many varnish coatings for the caps have been proposed. Varnishes of rubber chloride are applicable and the material has many virtues for this purpose owing to its chemical inertness; it is not affected by acids, alkalies, or alcohols, or by most of the materials packaged.

Rubber chloride is, however, to a certain extent soluble in the fatty oils and, conversely, it takes up fatty oils. A lining of rubber chloride is not grease-proof. Many foods, drugs and cosmetics contain fats or greasy materials and the susceptibility of rubber chloride varnish to grease is a serious drawback in its use for protecting bottle caps and similar closures.

I have, however, found that rubber chloride may be grease-proofed without detracting from its resistant properties in other respects, by incorporating into a rubber chloride varnish a small amount of a vinyl acetate resin. The two components apparently do not form a wholly homogeneous mixture in the varnish and the disappearance of solvent in drying does not improve their homogeneity. Whether because of this inhomogeneity or in spite of it, I find that a composition containing both vinyl acetate resin and rubber chloride is resistant to grease. This fact is utilized in the present invention.

In more detail, it has long been customary in the art to provide closures for containers of this type with linings of glass or enamel or other relatively non-reactive material. Such liners are unsatisfactory for many purposes however, because they are heavy, expensive, easily broken, and require some additional means, such as a rubber gasket, to effectively seal the container and protect its contents from the atmosphere.

Metal closures having their interior surfaces coated with lacquer or varnish have also been proposed, and are useful for many purposes, especially when the product to be packaged is substantially dry or unreactive. Such closures are not generally satisfactory for use with moist products, or products containing reactive ingredients, however. It is also necessary to use some other means for sealing closures of this type to the container, when air is to be excluded.

There has been considerable demand for a closure provided with a flexible liner which would have the effect of protecting the contents of the container from reaction with the closure body, and which would be sufficiently flexible or resilient to form a seal with the mouth or finish of the container. A useful liner for this purpose must be free from materials which impart taste, or odor, or color to the contents of the container, and must be capable of preventing the development of toxic or other injurious products, even on prolonged contact with the packaged material at widely varying temperatures. In addition, such liners must be sufficiently flexible or resilient to conform to the mouth or finish of the container to make an effective seal when the closure is in place; and they must be inexpensive and readily obtainable in the form of discs or other desired shapes. Still further, to adequately preserve the contents of the container, these liners must have a low permeability to moisture. To be suitable for general application, they must be resistant to the action of a wide variety of oils, greases, organic solvents, acids, bases and salts. A successful closure liner for food containers must be grease-proof.

I have found that a closure liner meeting the above requirements and having other desirable characteristics described hereinbelow may be prepared by coating paper or similar material with rubber chloride containing a minor amount of polymeric vinyl acetate, and advantageously containing a minor amount of a suitable plasticizer. Such a coating is applied in the form of a lacquer or varnish containing the essential ingredients dispersed in a solvent, and after evaporation of the solvent, the resulting film is apparently completely resistant to the action of essential oils, greases, alcohol, mineral oil, ammonia, dilute caustic, acetic acid, oxidizing agents, phenolic compounds, salt solutions, and numerous other reactive ingredients of materials commonly packaged in containers of this type.

The rubber chloride constituting the principal ingredient of the protective film on my closure liners advantageously contains 65 per cent or more of chlorine. Chlorinated rubbers with chlorine contents of the order of 64 to 66 per cent or more have been known for several years, and can be produced in various ways. In general, they are brittle, friable resins having interesting characteristics including resistance to the solvent action of water and aqueous solutions of acids, alkalies and salts, as well as alcohol, mineral oil and other organic solvents. Rubber chloride is, however, softened and eventually dissolved by contact with certain vegetable oils and essential oils.

For example, either cotton seed oil or turpentine will dissolve rubber chloride after prolonged contact at room temperature, and at elevated temperatures, such as 105° F., they will bring rubber chloride into solution in a few hours. For this reason, rubber chloride has not heretofore been accepted as a useful base for coating closures and closure liners. Many of the food products with which such closure liners are employed contain cotton seed oils or other vegetable oils, and many cosmetics, for example, contain turpentine or other essential oils. With the exception of this susceptibility, however, a rubber chloride film having low permeability to moisture (as produced from rubber chloride prepared in accordance with my co-pending applications, Serial Nos. 69,415, now Patent No. 2,148,832, issued February 28, 1939, 200,536, now Patent No. 2,247,407, issued July 1, 1941, and 245,293, for example) is superior to any other organic coating for closure liners which has been heretofore proposed. For example, it has a lower moisture transmission rate than the vinyl resin coatings disclosed in U. S. Patent 1,903,319, to Gray; and it is also more resistant to alcohols and organic acids. Still further, it is not affected by phenolic compounds, or oxidizing agents such as sodium hypochlorite and hydrogen peroxide; and it is not necessary to bake rubber chloride at high temperatures in order to obtain adequate resistance to water, acids, etc. It is therefore cheaper, as well as better, than the coatings for closure liners heretofore proposed.

I have now found that the addition of a minor amount of polymeric vinyl acetate to rubber chloride eliminates the susceptibility of resulting films to softening or attack by vegetable oils, greases and essential oils. The coating is thus rendered grease-proof. The amount of vinyl acetate which I employ for the purpose is from 5 per cent to about 30 per cent of the amount of rubber chloride, and I generally find that amounts from 10 to 20 per cent are most advantageous. The proportions may be varied in accordance with the particular properties required in connection with the packaging of any specific material, but I find that proportions in the range specified give films which are resistant to practically all materials packaged in containers of this type. Moreover, I find that the vinyl acetate polymer is decidedly more advantageous for this purpose than other vinyl polymers, such as vinyl chloride and the mixed polymers generally employed in "vinylite" preparations. Such other vinyl polymers have relatively little effect on the susceptibility of rubber chloride to vegetable oils.

When the rubber chloride employed as the base of my coating for container closures and liners is sufficiently pure and free from non-rubber substances, as in the case of the product of my application Serial No. 245,293, for example, the resulting films are sometimes sufficiently flexible and resistant to permit them to withstand substantial deformation without the presence of plasticizers. Plasticizers are often desirable, however, and the presence of vinyl acetate or other vinyl compounds in my coating material increases the desirability of having plasticizers present. Any of several known plasticizers may be included in my coating composition in minor amounts, among them being phthalates, such as di-butyl and di-amyl phthalate and di-butyl cellosolve phthalate; sebacates, such as di-butyl sebacate; and other liquid organic esters such as butyl-phthalyl-butyl glycollate, and butyl cellosolve stearate. Especially good results are obtained when chlorinated paraffin, advantageously containing about 40 per cent chlorine, is employed as the plasticizer. Other materials, such as chlorinated diphenyl, are also satisfactory plasticizers.

The inclusion of plasticizers generally decreases the resistance of rubber chloride to certain of the materials employed in evaluating protective films for closures, and this effect is more pronounced with larger amounts of plasticizers. I have found, however, that if the amount of plasticizers is less than 25 per cent of the rubber chloride, and advantageously from about 5 per cent to about 20 per cent, with a similar proportion of vinyl acetate polymer present, the resulting coating film is resistant to a great variety of reactive materials with which it may come in contact. When employing chlorinated paraffins as the plasticizer, larger amounts up to 30 per cent or more, on the chlorinated rubber, are permissible, but are seldom necessary.

The resulting plasticized films have great flexibility and will withstand severe deformation in sealing, for example, without fracture. In general therefore, coating compositions or varnishes which, upon drying, form films consisting principally of rubber chloride with about 5 to 25 per cent of polyvinyl acetate, and about 5 to 20 per cent of a suitable plasticizer, are most advantageous for my purposes.

As an illustration of the practice of the present invention, rubber chloride of high purity and moisture resistance was first produced in accordance with the process described in my aforementioned application, Serial No. 245,293. This rubber chloride is substantially free from non-rubber substances, such as sugars, proteins, resins, etc., and contains less than 0.02 per cent nitrogen and over 65 per cent chlorine. This material gives the most uniformly advantageous resin films, but excellent results have also been obtained in accordance with the present invention by starting with ordinary commercial rubber chloride which was brought into solution in a non-aqueous solvent, heated under reflux, and purified with decolorizing carbon and filter aid, as disclosed in my Patent No. 2,148,832.

In a suitable vessel, 18 parts by weight of polymerized vinyl acetate were dissolved in 225 parts by weight of toluol. There was next added 18 parts by weight of di-butyl sebacate to serve as a plasticizer. Agitation was continued until a solution was obtained, and 90 parts by weight of good quality rubber chloride, as previously described, were added and stirred into the solution. The solution was then filtered to remove dirt and insoluble particles, and was then ready for use.

As the base of the closure liner employed with this coating, a paper was selected having sufficient density to minimize permeation by the coating solution, or by the solvent. Numerous papers having satisfactory properties in this respect are available.

The varnish or resin solution was applied to this paper by roller coating, but it may also be applied by a knife or spreader, or by spraying or any other suitable means.

The coated paper was then dried in a drying oven of the festoon type, where it was subjected to a temperature of 220° F. for about 20 minutes. The time and temperature of baking may be varied in accordance with the type of oven employed and the particular composition of the coating applied, however. Multiple coatings may be applied by repeating the process, if desired.

In the example described, the coated paper had a dry film of 0.001 inch thickness. This film was tested for moisture permeability by the standard moisture vapor transmission method of the New York Paint & Varnish Production Club, using standard Payne cups, and the test showed a specific permeability of 0.1225 mg. at 100° F. and 0° R. H. As a comparison, a sheet of the same paper was coated with a solution consisting of 108 parts of "Vinylite HH" resin, 18 parts of dibutyl sebacate, and 225 parts of a solvent mixture consisting of 100 parts toluol, 100 parts methyl ethyl ketone and 25 parts methyl isobutyl ketone. The resulting film was baked for twenty minutes at a temperature which was gradually raised to 260° F. The coating thus formed had a specific permeability of 0.33 mg. at 100° F. and 0° R. H. This is nearly three times the permeability of the coated sheet produced in accordance with my invention.

As a further test of the coating produced in accordance with my invention, the coated paper was cut into closure liners, which were assembled with metallic closure bodies. Separate glass jars were then filled with each of the following testing materials:

Cotton seed oil
Turpentine
95% ethyl alcohol
"Nujol" mineral oil
Household ammonia
5% NaOH
50% acetic acid
"Zonite" (sodium hypochlorite)
"Lysol" (phenolic compound)
8% acetic acid and 20% salt
Hydrogen peroxide (3% solution)
Gasoline The assembled closures having liners coated as described hereinabove were then placed on the jars with the coating exposed to the contents, and the jars were heated to a temperature of 105° F. for five days. At the end of this time, the coatings on the liners were examined and none of them showed any signs of deterioration. Similar results were obtained with coatings in which di-amyl phthalate (18 parts by weight) was substituted for the di-butyl sebacate employed in the example described. Equally good results were also obtained with coatings containing 6 parts by weight of di-amyl-phthalate and of polyvinyl acetate to 90 parts by weight of rubber chloride, and with 12 parts each of the plasticizer and vinyl compound to 90 parts of rubber chloride. The results were also good, but no better, when using 18 parts plasticizer and 27 parts of vinyl compound to 90 parts of rubber chloride. With larger amounts, such as 30 per cent on the rubber chloride, of plasticizers other than chlorinated paraffin, the films were not resistant to alcohol, however; and in tests in which the plasticizers were used without the vinyl compounds, the films were not resistant to cotton seed oil and turpentine.

The paper coated as described with rubber chloride containing a minor proportion of vinyl acetate is not changed in color by the application of the coating. When white paper is used, the coated paper has a very clean white appearance. The coating is odorless, tasteless, and non-toxic, and extremely resistant to corrosive influences, as indicated by the tests described. This coating is therefore well adapted for liners for food products, beverages, cosmetics, drugs and the like.

In commercial practice, the coated paper is run through known stamping mechanisms which stamp out liners of any desired diameter. If desired, for special purposes, laminated lining materials may be employed, and these may be entirely of paper or other cellulosic material, or may include aluminum foil or other material. In any case, the coating is sufficiently flexible to conform to the container mouth during sealing, and because of its extremely low moisture transmission rate, it insures the retention in the container of volatile ingredients to a greater extent than with other commercial liners now available. A further advantage is that my new closure liner coating is sufficiently low in cost to compare favorably from an economic standpoint, even with inferior materials now on the market.

While my coating of rubber chloride containing a minor amount of vinyl acetate polymer gives especially advantageous results when applied to liners for container closures, it is also useful for many other applications where resistance to greases, solvents, acids, bases and salts is desired. For example, it may be applied directly to the surfaces of metal and other articles, including closures. Pigments may also be included in the coating composition if desired, and they are often advantageous in that they reduce the specific permeability still further. Any compatible pigment may be employed.

Figure 2:
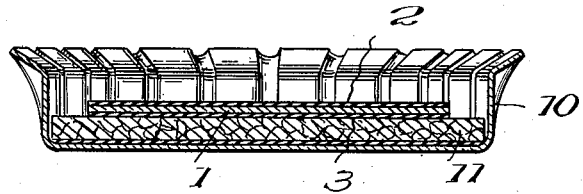

In order that the invention may be more readily understood it will be described in connection with the accompanying drawing in which Fig. 1 is a view of a strip of lining material for container closures, with parts broken away; and Fig. 2 is a sectional view of a container closure provided with a liner, in accordance with this invention.

In Fig. 1 the lining material illustrated in sheet form comprises a strip of paper 1 provided on one surface with a coating consisting principally of rubber chloride and containing polymerized vinyl acetate in an amount from 5 to 30 per cent of the amount of rubber chloride, in accordance with this invention. This coating may or may not contain plasticizers as described in more detail hereinabove. It is often convenient to provide the paper base with an adhesive layer 3 on the opposite side to assist in assembling the liner with the remainder of the closure, as is well known in the art. The actual liners for container closure are stamped or cut from strips or sheets of coated material, as illustrated in Fig. 1, in any desired manner.

Fig. 2 shows a closure of conventional type comprising a metal shell 10 and a cushion 11 of cork or other suitable material, which is provided with a liner in accordance with this invention. As previously stated this liner comprises a paper base 1 provided with a coating 2 on the exposed surface, this coating comprising rubber chloride and polymerized vinyl acetate as described in more detail hereinabove. The liner is secured to the cushion 11 by means of adhesive 3. In the specific embodiment shown in Fig. 2 the liner is of the "spot" type and covers only a portion of the surface of the cushion. Liners in accordance with my invention may, however, be of other types including those covering the entire surface of the closure or the cushion thereof.

What I claim is:

1. A liner for container closures, comprising a paper base having sufficient density to minimize permeation by a coating solution applied thereto, and a coating applied to said paper base and adapted to protect the said base from greases, petroleum hydrocarbons and solutions of acids, bases and salts, said coating consisting principally of rubber chloride, and containing polymerized vinyl acetate in an amount from 5 to 30 per cent of the amount of rubber chloride.

2. The liner of claim 1, wherein the said coating contains a minor amount of plasticizing agent.

3. The liner of claim 1, wherein the said coating contains a minor amount of chlorinated paraffin serving as a plasticizing agent.

JAMES WALLACE RAYNOLDS.